July 11, 1933.          R. S. KINKEAD          1,917,649
MOWER
Filed July 20, 1929          4 Sheets-Sheet 1

Inventor
Robert S. Kinkead
By Caswell & Lagaard
Attorneys

July 11, 1933.  R. S. KINKEAD  1,917,649
MOWER
Filed July 20, 1929  4 Sheets-Sheet 2

Inventor
Robert S. Kinkead
Attorneys

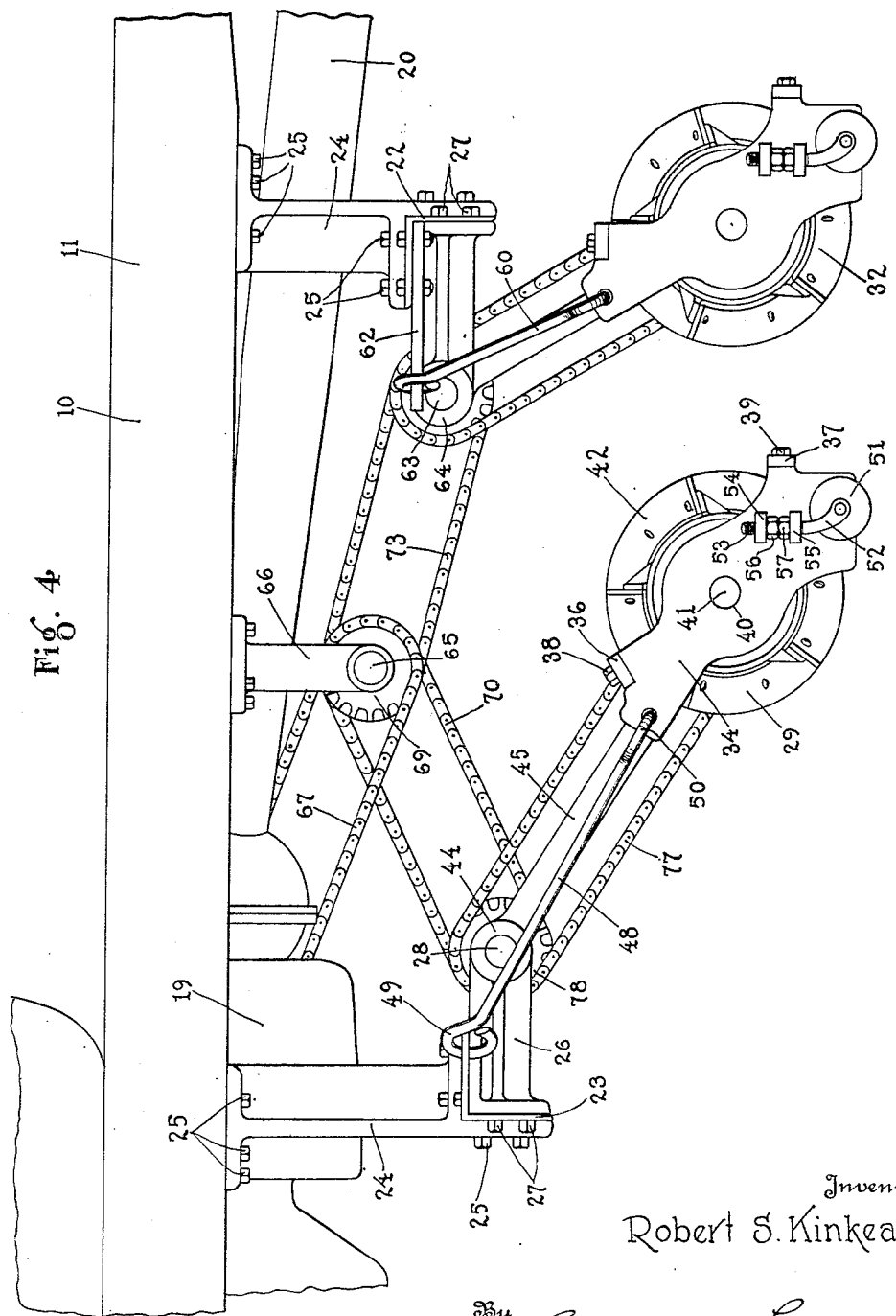

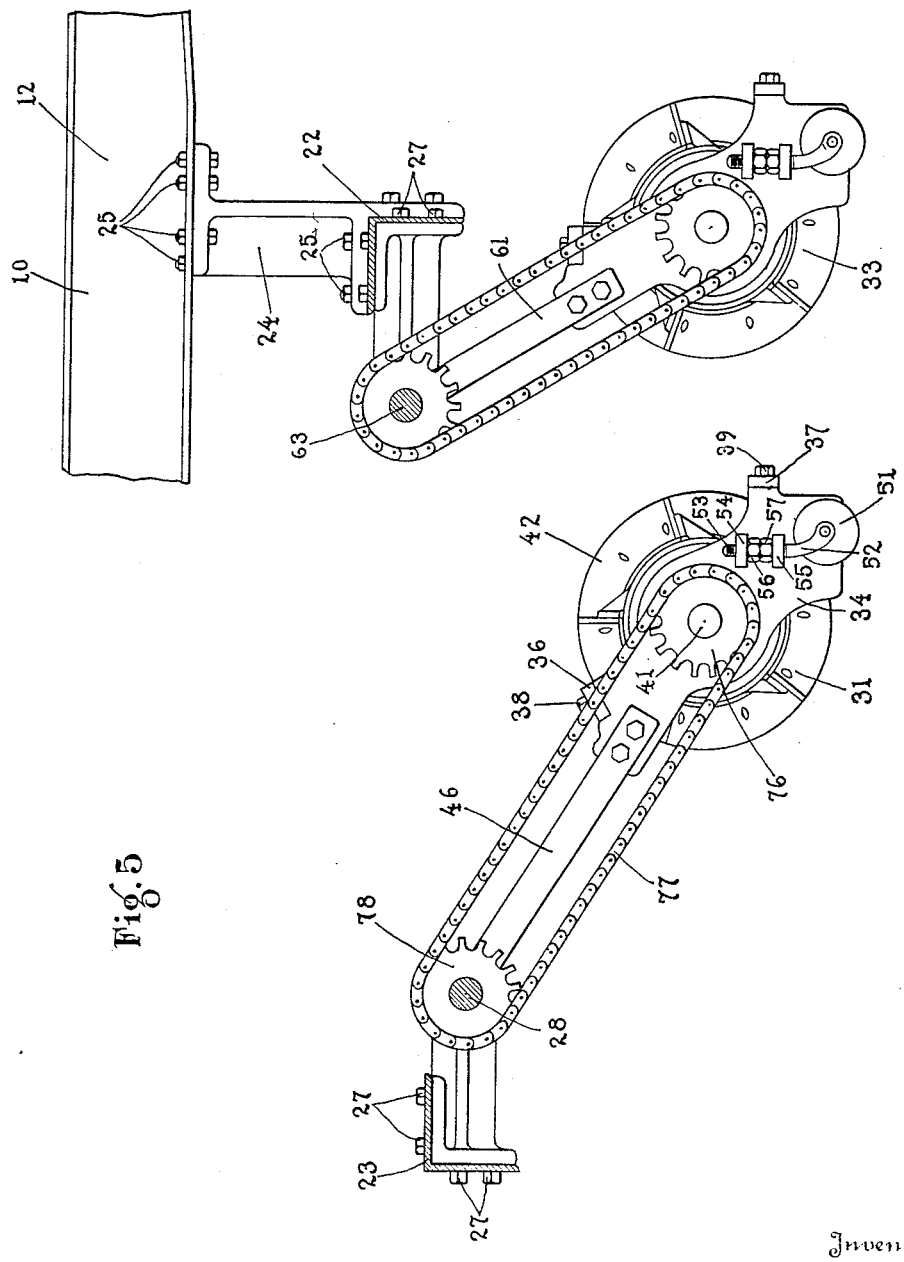

Patented July 11, 1933

1,917,649

UNITED STATES PATENT OFFICE

ROBERT S. KINKEAD, OF ST. PAUL, MINNESOTA

MOWER

Application filed July 20, 1929. Serial No. 379,769.

My invention relates to mowers, and particularly to mowers adapted to be used in conjunction with vehicles.

An object of the invention resides in providing a mower which may make exceedingly sharp turns and which will effectively cut the grass while making such turns.

Another object of the invention resides in providing a mower which may be readily attached to an existing motor vehicle, such as a tractor or truck or other vehicle without the necessity of reconstructing the same.

Another object of the invention resides in providing a mower of the reel type adapted to be driven from the motor of the vehicle with which the same is to be used.

An object of the invention resides in employing a plurality of individual mowing units, and in mounting said mowing units in staggered relation upon a pair of cross frame members situated between the front and rear wheels of the tractor with which the mower is to be used.

A still further object of the invention resides in mounting the mower units for swinging movement relative to the ground and vehicle frame to permit of the adjustment of the height of the bed knife relative to the ground, and to permit of the units following the contour of the ground, as the vehicle is propelled.

An object of the invention resides in restraining the mower units from lateral movement with respect to the vehicle frame, and in driving the reels of the mower units independently of their travel relative to the ground.

Another object of the invention resides in mounting the mower units so that the same may have independent movement at the ends thereof toward and from the ground and vehicle frame to allow the same to follow the contour of the ground.

A still further object of the invention resides in mounting on the mower cross frames shafts adapted to be driven from the motor of the vehicle, said mowers being driven from said shafts.

A feature of the invention resides in pivoting to said shafts arms connected to said mower units, and in further mounting on said shafts driving means for driving the reels of said mower units adapted to swivel upon said shaft and effect the driving thereof during the movement of said arm.

An object of the invention resides in providing separate arms for each end of the mower units, one of said arms being rigidly connected and the other hingedly connected to the mower units to permit of the independent movement of the ends of the mower toward and from the ground and vehicle frame.

Other objects of the invention reside in the novel combination and arrangement of parts, including the details of construction hereinafter illustrated and/or described.

In the drawings:

Fig. 4 is an end elevational view of a portion of the structure shown in Fig. 2 drawn to a larger scale.

Fig. 5 is a cross sectional view similar to Fig. 4, taken on line 5—5 of Fig. 1.

Figure 1:
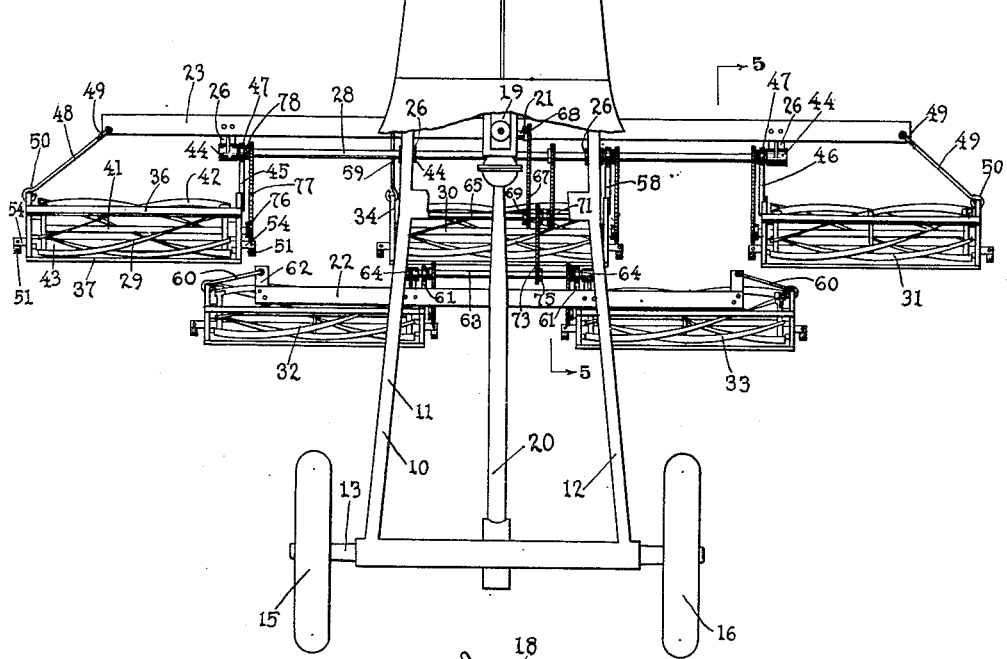
Fig. 1 is a plan view of the chassis of a motor vehicle illustrating an application of my invention thereto.
Figure 2:
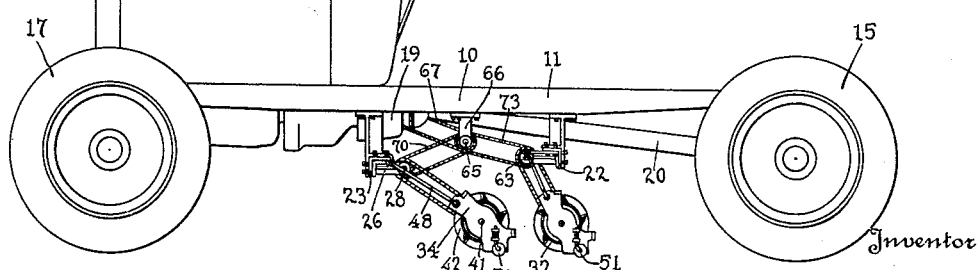
Fig. 2 is a side elevational view of the mower and motor vehicle shown in Fig. 1.

In the use of multiple or gang mowers for cutting grass in parks and on golf courses, and on similar lawns, considerable difficulty has been encountered in handling the mower where the mowers have been driven from the supporting wheels of the individual mower units. In such instances, the mower units are swivelly attached to one or more draw bars and necessarily follow the travel of the vehicle on which they are mounted. Such mower is readily operable when the vehicle is traveling along a straight line, but when the vehicle travels along a curved line the effectiveness in cutting is greatly reduced and where the curve is abrupt, such devices completely fail to function. The instant invention overcomes this disadvantage by providing a device which may be turned as sharply as is possible to turn the vehicle on which it is supported, and which at all times functions to cut the grass regardless of the movement of the same with respect to the ground proper, in this manner permitting of the cutting of lawns where numerous obstacles are present, and where angles and short radius curves occur.

For the purpose of illustrating the application of my invention, I have shown in the drawings in diagrammatic form the chassis of an ordinary motor vehicle. This chassis comprises a frame 10 having longitudinal frame members 11 and 12 supporting the usual rear axle housing 13 and front axle 14. The chassis further includes rear wheels 15 and 16 and front wheels 17 adapted to be steered through the usual steering wheel 18 in the ordinary manner. At the front of the vehicle, is mounted an engine which is provided with a transmission 19 from which the rear wheels 15 and 16 are operated through a propeller shaft incased in a tubular housing 20. The transmission case 19 may be of any desired construction and is provided with a shaft 21 issuing outwardly therefrom which is adapted to be driven through a clutch and suitable gearing from the motor proper. Transmission devices with power take-off shafts, such as illustrated, being well known in the art, the construction of the transmission 19 has not been illustrated in detail, although it can be comprehended that any suitable device of such character may be employed such as disclosed in Patent No. 1,147,035.

The invention proper consists of a number of individual mower units which I have indicated at 29, 30, 31, 32 and 33. These mower units are substantially identical in construction and only the unit 29 will be described in detail.

The mower unit 29 is of the reel type and consists of two end frame members 34 and 35 connected together by means of two bars 36 and 37 bolted to the said end frame members through bolts 38 and 39. The end frame members 34 and 35 are constructed with bearings 40 which journal a reel shaft 41. The shaft 41 carries a reel 42 which cooperates in the usual manner with a bed knife 43 carried by the end frame members 34 and 35. This knife may be adjustably supported relative to the reel 42 to cause the reel to cut in the desired manner and to take up wear as the grass cutting unit becomes worn.

The various mower units 29, 30, 31, 32 and 33 do not have the customary supporting wheels for driving the same, but are driven independently in a manner to be presently described in detail. For the purpose of maintaining the bed knife 43 the proper distance from the ground, each of the mower units is provided with caster wheels 51 which are attached to each of the end plates 34 and 35. Each of the caster wheels 51 is attached to a supporting bracket 52 which is constructed with a vertical threaded shank 53 extending upwardly through two lugs 54 and 55 issuing outwardly from the end plates 34 and 35. Upon the threaded portion 53 of the bracket 52 and between the lugs 54 and 55 are disposed a nut 56 and a lock nut 57 by means of which the caster wheels 51 may be adjusted to vary the height of the bed knife above the ground. The spacing between the lugs 54 and 55 is such as to permit of the swinging of the bracket 52 to allow the caster wheels to follow the travel of the vehicle, and at the same time holds the caster wheels at a fixed elevation with respect to the mower unit frames.

Figure 3:
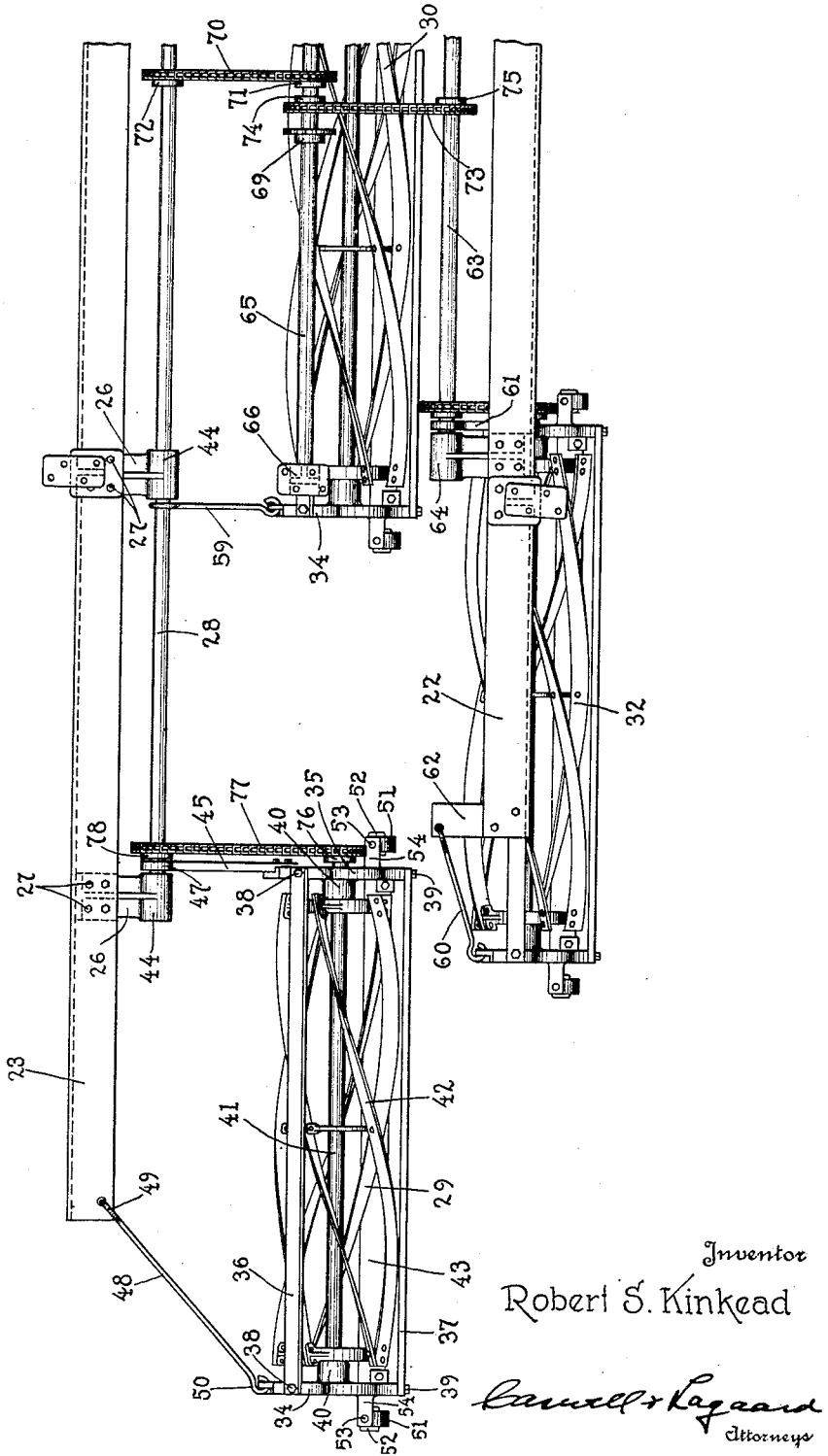
Fig. 3 is a fragmentary plan sectional view of the mower and mower frame detached from the motor vehicle and drawn to a larger scale.

The various mower units 29, 30, 31, 32 and 33 are arranged in groups and supported upon two transverse frame members 22 and 23 which are rigidly secured to the frame members 11 and 12 of the chassis 10 through short struts 24 bolted to said frame members through bolts 25. The mowers 29, 30 and 31 are mounted on the frame member 23 and are disposed in spaced relation to one another, while the mowers 32 and 33 are mounted on the frame member 23 immediately rearwardly of the first named mower units so as to cut the stretch of grass omitted between the forward mower units. Both of the frame members 22 and 23 may be constructed of angle stock or any other suitable structural shape. The frame member 23 has attached to it four brackets 26 which are bolted thereto through bolts 27 and which are formed at the ends thereof with bearings 44 journaling a shaft 28 extending in the same direction as the said frame member 23. In like manner, a shaft 63 is journaled in bearings 64 similar to the bearings 44 which are attached to the frame member 22. The shaft 28 has mounted upon it at the extreme ends thereof two arms 45 and 46 which are hingedly connected through loose bearings 47 with the said shaft, said arms being rigidly secured to the end frame members 35 and 34 respectively of the mower unit 29 and 31. These various arms are suitably held from axial movement along the shaft 28. These two mower units are further attached to the frame members 23 by means of links 48 which are constructed with eyes 49 and 50 at the ends thereof and which are hooked into the complemental end frame members of the said mower units and into the ends of the frame member 23, as best shown in Figs. 1, 3 and 4. The eyes 49 and 50 fit loosely in the repective parts to which they are attached, while the bearing 47 also permits of twisting of the arms 45 and 46 a certain amount. By means of this construction, the mower units 29 and 31 may be independently moved at either end thereof to a certain extent to permit of the said mower units following the contour of the ground as the vehicle is propelled. The mower unit 30 is likewise supported through an arm 58 similar to the arms 45 and 46 which is hingedly mounted upon the shaft 28 and rigidly connected to the mower unit frame 35 of the said mower unit. A link 59 is hingedly mounted at one end on the shaft 28, and is provided at its other end with a hook which is connected to the frame member 34 of the mower unit 30. In this manner, the said mower unit it likewise mounted for independent movement at its ends toward and from the vehicle frame to permit of the mower following the contour of the ground.

The two mower units 32 and 33 are mounted immediately back of the spaces between the forward mower units and are similarly attached to the frame member 22 and the shaft 63 by means of links 60 and arm 61 substantially the same as links 48 and arms 45. If desired, however, the links 60 may be connected to short extensions 62 which are attached to the ends of the frame member 22 so as to bring the axis of the upper eyes of the said links in substantial alignment with the axis of the shaft 63 on which the arms 61 are mounted. The arms 61 are loosely mounted upon the shaft 63 in the same manner as the arms 45 and 46 so that the mower units 32 and 33 may have independent vertical movement the same as the other mower units.

The various mower units are driven from the motor of the vehicle as follows: Between the frame members 11 and 12 of the vehicle chassis 10 is journaled a transverse shaft 65 which is rotatably mounted in bearings 66 attached to the said vehicle frame members. This shaft is driven from the shaft 21 of the transmission 19 through a chain 67 which passes over a sprocket wheel 68 secured to the shaft 21 and another sprocket wheel 69 secured to the shaft 65. A chain 70, passing over a sprocket wheel 71 fast on shaft 65 and another sprocket wheel 72 keyed to shaft 28 from the shaft 65. In like manner, a chain 73 passes over a sprocket wheel 75 secured to the shaft 63 and a sprocket wheel 74 secured to the shaft 65. In this manner, power from the take-off shaft is transmitted simultaneously to the two shafts 28 and 63.

The reels of the various mower units are driven from the shafts 28 and 63. The shafts 41 of each of the mower units is provided with a sprocket wheel 76 which is driven through a chain 77 from a corresponding sprocket wheel 78. These latter sprocket wheels are mounted on the two shafts 28 and 63 and operate to drive the various mower wheels 42 as the motor of the vehicle operates. In this manner, when power is applied to the shaft 21 through a suitable clutch mechanism, the various mower units 29, 30, 31, 32 and 33 are caused to simultaneously rotate. By the use of chains for driving the various mower units a slight twisting or weaving of the said units may take place without affecting the driving of the mower reels, thereby permitting the mowers to follow the contour of the ground as the same pass over the grass to be cut. By pivoting the mowers at the axes of the driving shafts 28 and 63, the lengths of the various chains remain unchanged during the swinging of the said mower units thereby permitting the mower units to move toward and from the vehicle frame to allow the mowers to follow irregularites in the elevation of the ground.

Although I have shown my invention as applied to the frame structure of the vehicle intermediate the front and rear wheels thereof, it can be readily comprehended that the invention may be applied either forwardly or rearwardly of the vehicle as the occasion may arise. It is also to be noted that chains have been used for driving the various mowers, though it can be readily comprehended that other forms of power transmission may be utilized in place thereof. Although I find it most economical to drive the mower units from the transmission of the mower vehicle motor, an independent motor may be employed which may be utilized for the purpose of operating the reels.

In the operation of the invention, the motor vehicle is propelled in the ordinary manner through the motor thereof and the transmission for driving the reels connected with the motor vehicle transmission through the clutch provided. This causes all of the reels to simultaneously rotate. Without further attention, the operator of the motor vehicle drives the device over the course while the mower units automatically adjust themselves to the contour of the ground, and cut the grass with a clean sweep, as the vehicle travels. Due to the fact that the mower units are restrained from lateral movement on account of the arms rigidly attached thereto, the said mowers may be constantly driven from a source of power independent of the travel of the mower along the ground. When so driven the mowers may travel laterally with respect to the ground and yet operate to cut the grass, as such movement occurs. Due to the use of the caster wheels with the mower frames, the mowers are at all times supported at a suitable height above the ground to properly cut the grass.

My invention is highly advantageous in that the device is extremely simple and effective for cutting grass on large lawns, such as parks, golf courses and the like. The driving of the mower reels being independent of their travel along the ground, the vehicle may be driven at different speeds and moved in any direction possible with the ordinary motor vehicle without affecting the cutting of the grass. Where particularly heavy grass is to be cut, the motor vehicle may be propelled at a lower rate of speed and the reels operated at the usual rate of speed. By driving the mower units independently of the ground, the cutting up of the turf through the supporting drive wheels of motor units ordinarily employed is entirely prevented. In addition, a much lighter mower construction may be employed, greatly reducing the expense of the device and at the same time reducing the weight carried by the caster wheels. The mowers being pivotally mounted for movement toward and from the vehicle frame readily follow the contour of the ground, and due to their relatively light weight are easily raised when striking an obstruction, thereby preventing accidental breaking of the various units.

Changes in the specific form of my invention, as herein disclosed, may be made within the scope of what is claimed without departing from the spirit of my invention.

Having described my invention, what I claim as new and desire to protect by Letters Patent is:

1. In combination with the frame of a vehicle, a mower frame, a reel journalled for rotation in said mower frame, a bed knife mounted in said frame and cooperating with said reel, attaching means secured to said vehicle frame, an arm hingedly connected to said attaching means at one end and hingedly connected at its other end to one end of the mower frame, a second arm hingedly connected to said attaching means at one end and rigidly connected at its other end to the other end of the mower frame, means for restraining the mower frame from lateral movement relative to the vehicle frame, means for retaining the mower bed knife at a predetermined height above the ground, and means for driving said reel.

2. In combination with the frame of a vehicle, a cross frame attached to said vehicle frame and including front and rear frame members, a shaft carried by said vehicle frame, means for driving said shaft, a group of mower units connected to one of said cross frame members, and spaced from one another, a second group of mower units connected to the other of said cross frame members and following said first named group of mower units in staggered relation thereto, a counter-shaft mounted on one of said cross frame members and driven from said shaft, means for driving each of said first named mowers from said counter-shaft, a second counter-shaft disposed on said second cross frame member, and means for driving said second named mower units from said latter counter-shaft.

3. In combination with the frame of a vehicle, a cross frame attached to said vehicle frame, a shaft mounted on said cross frame, means for driving said shaft, a plurality of mower units each comprising a reel, and a bed knife, mounted upon a frame, a pair of arms for each of said mower units hingedly mounted about an axis substantially in alignment with the axis of said shaft, and connected to the end of said mower unit frame, and means driven by said shaft for driving said mower reels, said means swivelling with said shaft to effect the driving of said reels during the swinging of said arms relative to said shafts.

4. In combination with the frame of a vehicle, a cross frame attached to said vehicle frame, a shaft mounted on said cross frame, means for driving said shaft, a plurality of mower units each comprising a reel, and a bed knife mounted on a frame, a pair of arms for each of said mower units hingedly mounted at the axis of said shaft and connected to the end of said mower unit frame, a sprocket wheel on said shaft, a sprocket wheel on said reel, and a chain passing over said sprocket wheels for driving said reel.

5. In combination with the frame of a motor vehicle, a cross frame, a shaft mounted on said cross frame, a plurality of mower units connected to said cross frame, means for driving said mower units from said shaft, means for detachably supporting said cross frame relative to said vehicle frame, and detachable means for driving said shaft from the motor of the vehicle.

6. In combination with the frame of a vehicle, a cross frame attached to said vehicle frame and including front and rear frame members, a shaft carried by said vehicle frame, means for driving said shaft, a group of mower units connected to one of said cross frame members and spaced from one another, a second group of mower units connected to the other of said cross framed members and following said first named group of mower units in staggered relation thereto, said mower units including relatively movable cutter elements, and power transmitting means for independently moving one of the cutting elements of each of said mower units relative to the other, said means being driven from said shaft.

7. In combination with a motor vehicle having driving wheels, a motor, and a transmission for driving the wheels from the motor, a mower frame, a reel journaled for rotation in said mower frame, a bed knife mounted in said frame and cooperating with said reel, means for supporting the mower frame on the vehicle in a manner to cut the grass on the ground over which the vehicle travels and transmission means driven from the vehicle motor for rotating the reel, said transmission means being independent of the vehicle wheels.

8. In combination with a motor vehicle having driving wheels, a motor, and a transmission for driving the wheels from the motor, a mower frame, a reel journaled for rotation in said mower frame, a bed knife mounted in said frame and cooperating with said reel, means for supporting said mower frame from the vehicle and for restraining the same from lateral movement, means for maintaining the bed knife at a predetermined height above the ground, and transmission means driven from the vehicle motor for rotating the reel, said means being independent of the vehicle wheels.

In testimony whereof I have affixed my signature to this specification.

ROBERT S. KINKEAD.